(12) United States Patent
Majima et al.

(10) Patent No.: US 11,789,668 B2
(45) Date of Patent: Oct. 17, 2023

(54) IMAGE FORMING SYSTEM THAT STARTS TO EXECUTE CALIBRATION AT INSERTION START TIMING OF INTERLEAVING PAPER

(71) Applicant: KYOCERA Document Solutions Inc., Osaka (JP)

(72) Inventors: Tatsuya Majima, Osaka (JP); Kenji Miyamoto, Osaka (JP); Hideo Tanii, Osaka (JP); Takahiro Honda, Osaka (JP); Makoto Matsumoto, Osaka (JP); Takuya Aritsuki, Osaka (JP); Hiroyuki Yamaguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/967,971

(22) Filed: Oct. 18, 2022

(65) Prior Publication Data

US 2023/0128053 A1 Apr. 27, 2023

(30) Foreign Application Priority Data

Oct. 27, 2021 (JP) .................. 2021-175849

(51) Int. Cl.
*G06F 3/12* (2006.01)

(52) U.S. Cl.
CPC .......... *G06F 3/1208* (2013.01); *G06F 3/1253* (2013.01); *G06F 3/1204* (2013.01)

(58) Field of Classification Search
CPC ...... G06F 3/1208; G06F 3/1253; Y02D 10/00
USPC ........................................ 358/1.15
See application file for complete search history.

(56) References Cited

U.S. PATENT DOCUMENTS

| 2008/0219543 A1* | 9/2008 | Csulits ............ | G07D 7/12 |
| | | | 382/135 |
| 2016/0103633 A1* | 4/2016 | Huijbers ......... | B65H 7/06 |
| | | | 347/16 |

FOREIGN PATENT DOCUMENTS

JP 2005106921 A 4/2005

* cited by examiner

*Primary Examiner* — Darryl V Dottin
(74) *Attorney, Agent, or Firm* — IP BUSINESS SOLUTIONS, LLC

(57) ABSTRACT

An image forming system includes an image forming apparatus and an insertion device. The image forming apparatus includes an image forming device, a transport device, and a control device. The control device acts as a controller and an executer. The controller causes the image forming device to execute a printing job, and causes the insertion device to insert the interleaving paper in a printed material at an insertion start timing designated by the printing job. The executer executes calibration at an execution start timing set in advance, and sets a time point that a predetermined time has elapsed after a previous calibration to the execution start timing in advance. The executer starts to execute the calibration at the insertion start timing, when a predetermined condition is satisfied.

5 Claims, 11 Drawing Sheets

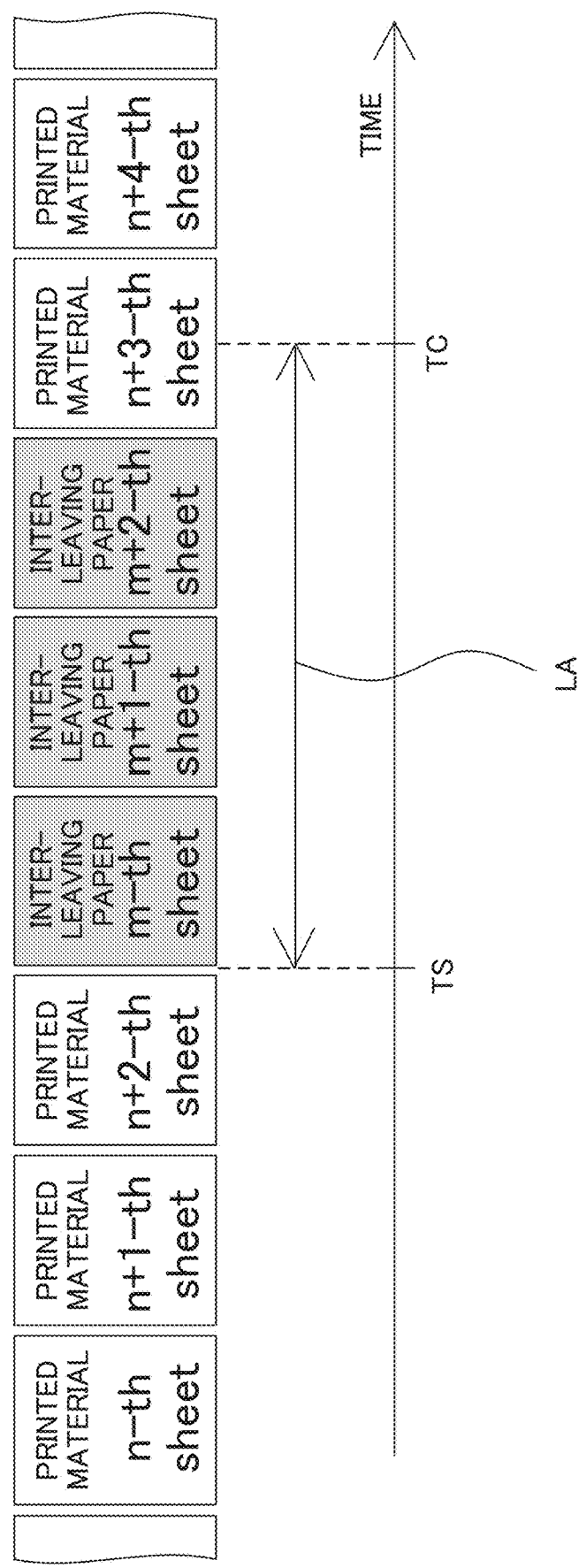

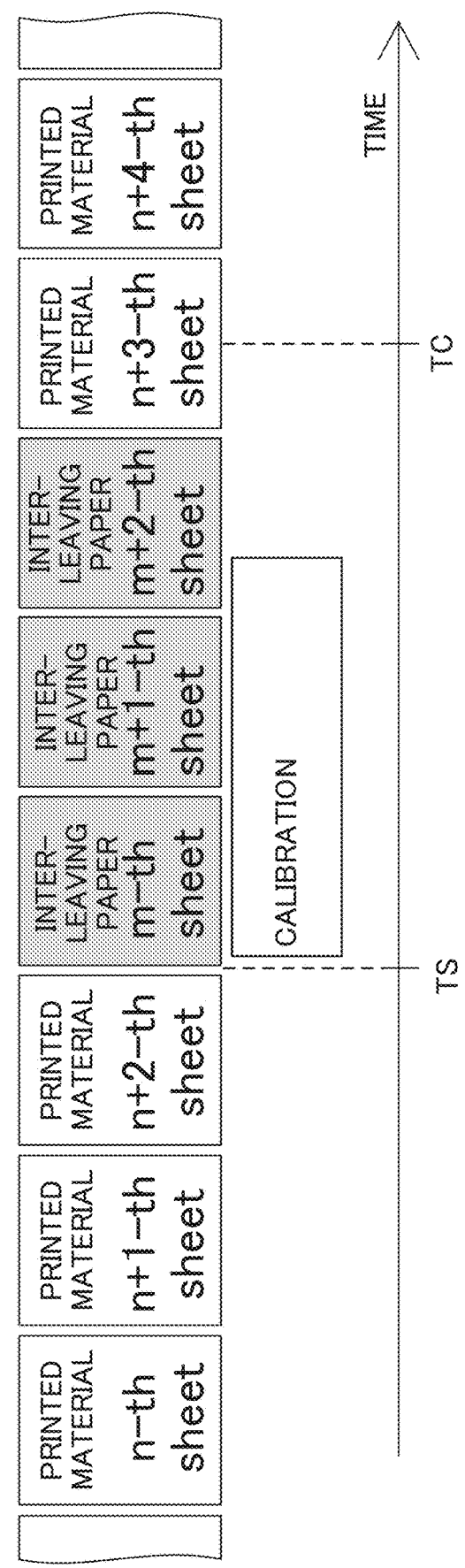

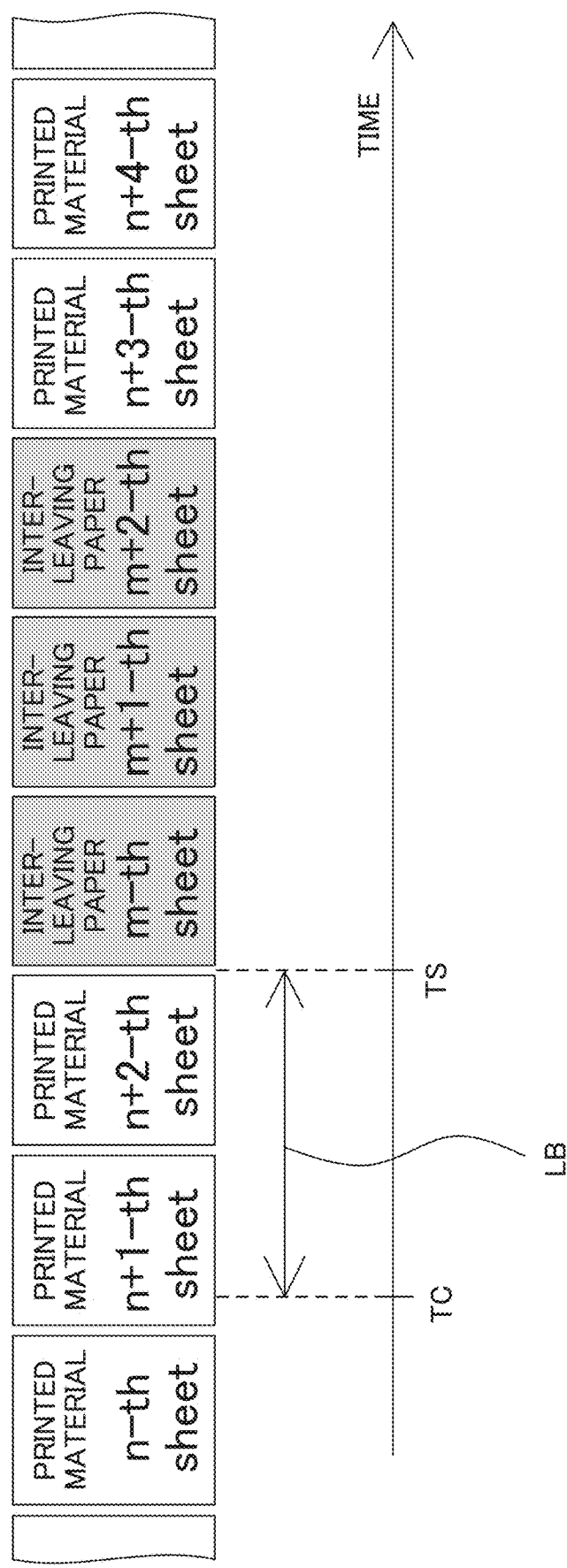

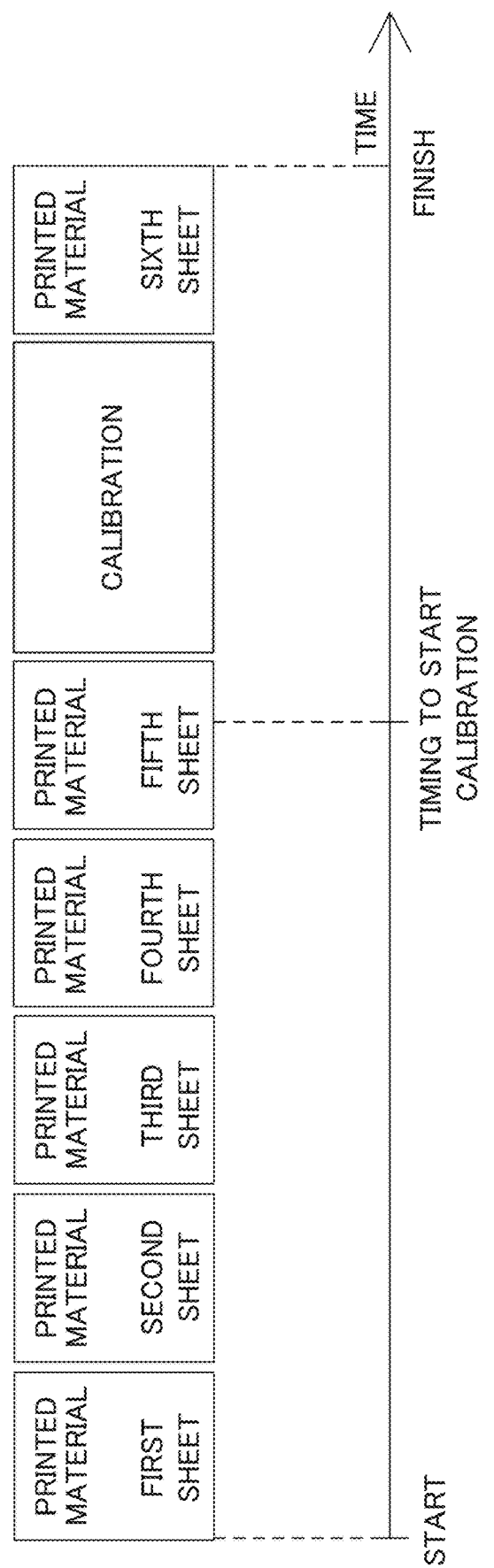

IMAGE FORMING SYSTEM THAT STARTS TO EXECUTE CALIBRATION AT INSERTION START TIMING OF INTERLEAVING PAPER

INCORPORATION BY REFERENCE

This application claims priority to Japanese Patent Application No. 2021-175849 filed on Oct. 27, 2021, the entire contents of which are incorporated by reference herein.

BACKGROUND

The present disclosure relates to an image forming system including an insertion device that inserts an interleaving paper in a printed material.

Some of existing image forming apparatuses, such as a printer and a multifunction peripheral, are configured to execute calibration, for the purpose of maintenance and adjustment of picture quality of the printed material. Such an image forming apparatus decides that the execution start timing of the calibration has been reached, when a predetermined period of time has elapsed from the previous calibration, or when the number of printed sheets has reached a predetermined number, and executes the calibration.

SUMMARY

The disclosure proposes further improvement of the foregoing techniques.

In an aspect, the disclosure provides an image forming system including an image forming apparatus, and an insertion device. The image forming apparatus includes an image forming device that forms an image on a sheet, thereby producing a printed material, and a transport device that transports the sheet. The insertion device inserts an interleaving paper in the printed material, by providing the interleaving paper on a downstream side of the image forming device in a sheet transport direction. The image forming apparatus further includes a control device including a processor, and configured to act as a controller and an executer, when the processor executes a control program. The controller causes the image forming device to execute a printing job, and causes the insertion device to insert the interleaving paper in the printed material at an insertion start timing designated by the printing job. The executer executes calibration, for maintenance and adjustment of picture quality of the printed material, at an execution start timing set in advance, and sets a time point that a predetermined time has elapsed after a previous calibration to the execution start timing in advance. The executer starts to execute the calibration at the insertion start timing, when a predetermined condition is satisfied.

BRIEF DESCRIPTION OF THE DRAWINGS

FIG. 4A is a time chart for explaining a time from an insertion start timing of an interleaving paper to an execution start timing of a calibration;

FIG. 4B is a time chart for explaining the case where the calibration has been moved up;

FIG. 5A is a time chart for explaining a time from the execution start timing of the calibration to the insertion start timing of the interleaving paper;

FIG. 6B is a time chart showing an exemplary operation performed by the existing image forming apparatus, when the execution start timing of the calibration is reached during formation of a printed material.

DETAILED DESCRIPTION

Figure 1:
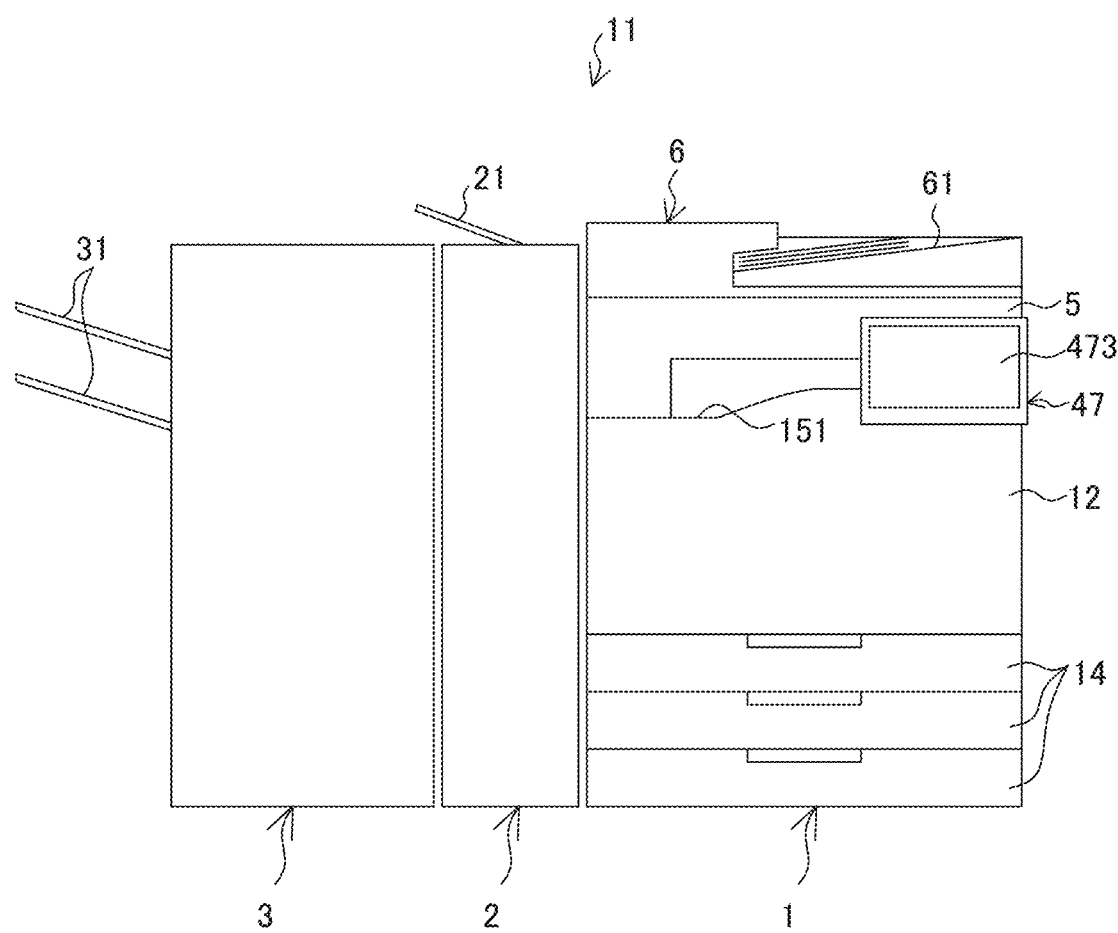
FIG. 1 is a front view schematically showing the appearance of an image forming system according to an embodiment of the disclosure.

Hereafter, an image forming system according to an embodiment of the disclosure will be described, with reference to the drawings. FIG. 1 is a front view schematically showing the appearance of the image forming system 11 according to the embodiment of the disclosure. The image forming system 11 includes an image forming apparatus 1, an insertion device 2, and a postprocessing device 3. The insertion device 2 is connected to the image forming apparatus 1. The postprocessing device 3 is connected to the insertion device 2.

The image forming apparatus 1 is a multifunction peripheral having a plurality of functions, such as copying, printing, scanning, and facsimile transmission. The insertion device 2 serves as an inserter that inserts an interleaving paper in a printed material outputted by the image forming apparatus 1. The postprocessing device 3 serves as a finisher that executes a postprocessing (e.g., stapling or punching) to the sheet (printed material or interleaving paper) outputted by the insertion device 2.

The image forming apparatus 1, the insertion device 2, and the postprocessing device 3 each include a control device and a communication port. The image forming apparatus 1 and the insertion device 2 can communicate with each other via the respective communication ports. The insertion device 2 and the postprocessing device 3 can also communicate with each other, via the respective communication ports. Therefore, the image forming apparatus 1 can control the insertion device 2. The image forming apparatus 1 can also control the postprocessing device 3, via the insertion device 2.

The image forming apparatus 1 includes a document feeding device 6, a document reading device 5, an image forming device 12, a paper feeding device 14, and an operation device 47.

The document feeding device 6 is openably connected to the upper face of the document reading device 5, for example via a hinge. The document feeding device 6 serves as a document retention cover, when the document reading device 5 reads a source document placed on a platen glass. The document feeding device 6 is an automatic document feeder, abbreviated as ADF. The document feeding device 6 includes a document tray 61, and delivers the source documents placed thereon, to the document reading device 5 one by one.

To perform the document reading operation, the image forming apparatus 1 operates as follows. The document reading device 5 optically reads the image on the source document delivered from the document feeding device 6 to the document reading device 5, or placed on the platen glass, and generates image data. The image data generated by the document reading device 5 is stored, for example, in an image memory.

To perform the image forming operation, the image forming apparatus 1 operates as follows. The image forming device 12 forms a toner image on a recording sheet serving as the recording medium, delivered from the paper feeding device 14, on the basis of the image data generated through the document reading operation, or image data received from an external device such as a personal computer (PC), connected via the network, thereby producing a printed material.

The sheet on which the toner image has been formed by the image forming device 12 (printed material) is subjected to a fixing process, and delivered to an output tray 151, or to the insertion device 2 from the left side face of the apparatus main body.

The operation device 47 receives the user's instructions to execute the functions and operations that the image forming apparatus 1 is configured to perform, for example the image forming operation. The operation device 47 includes a display device 473 for displaying, for example, an operation guide for the user. The operation device 47 receives, through a touch panel provided on the display device 473, the user's instruction based on the operation performed by the user (e.g., touch operation) on the operation screen displayed on the display device 473, or on a physical key.

The display device 473 includes, for example, a liquid crystal display (LCD). The display device 473 includes the touch panel. When the user touches a button or a key displayed on the screen, the touch panel receives the instruction corresponding to the touched position.

The insertion device 2 includes a relay transport route for transporting the printed material outputted by the image forming apparatus 1 to the postprocessing device 3, an inserter tray 21 for placing the interleaving paper thereon, an insertion transport route for transporting the interleaving paper taken in from the inserter tray 21, to the relay transport route, a pickup mechanism for taking in the interleaving paper from the inserter tray 21, and a transport roller pair for transporting the printed material or the interleaving paper. The insertion device 2 provides the interleaving paper at a position downstream of the image forming device 12 of the image forming apparatus 1 in the sheet transport direction, thereby interposing the interleaving paper between the sheets outputted from the image forming apparatus 1, thus inserting the interleaving paper in the printed material.

On the relay transport route, a sensor for detecting the printed material or the interleaving paper, proceeding along the relay transport route, is provided. On the insertion transport route, a sensor for detecting the interleaving paper proceeding along the insertion transport route is provided.

The postprocessing device 3 includes a stapling device that staples the sheet (printed material or interleaving paper) outputted from the insertion device 2, and a punching device that punches the sheet outputted from the insertion device 2. An output tray 31, to which the sheet that has undergone the postprocessing is delivered, is provided on the left side face of the main body of the postprocessing device 3. Here, the printed material or the interleaving paper may be delivered to the output tray 31 as it is, without being subjected to the postprocessing.

Figure 2:
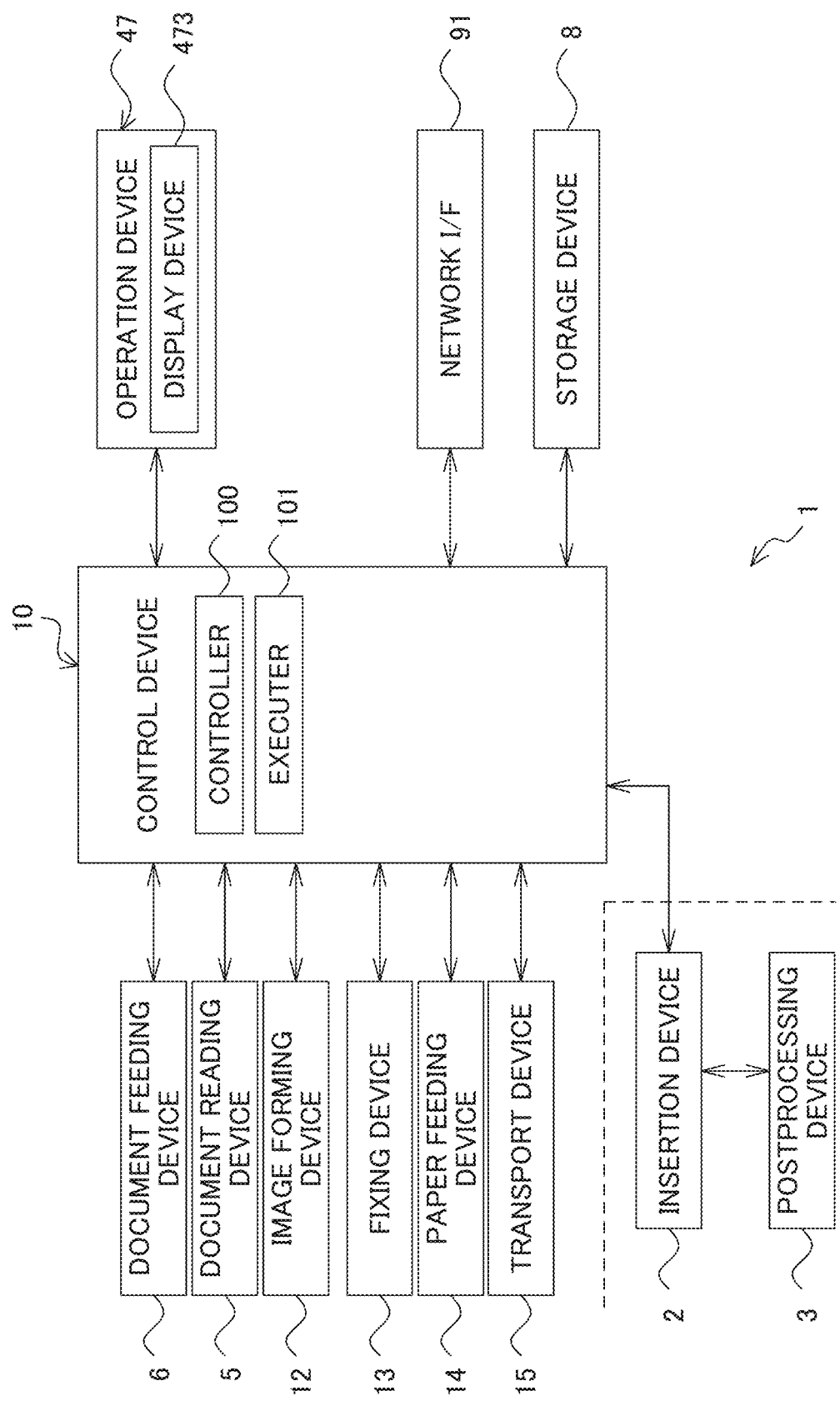
FIG. 2 is a functional block diagram showing an essential internal configuration of the image forming apparatus.

FIG. 2 is a functional block diagram schematically showing an essential internal configuration of the image forming apparatus 1. The image forming apparatus 1 includes a control device 10, the document feeding device 6, the document reading device 5, the image forming device 12, a fixing device 13, the paper feeding device 14, a transport device 15, the operation device 47, a network interface (I/F) 91, and a storage device 8.

The image forming apparatus 1 possesses a calibration function, for the purpose of maintenance and adjustment of picture quality of the printed material. The image forming apparatus 1 is connectible to the insertion device 2. The image forming apparatus 1 is also connectible to the postprocessing device 3, via the insertion device 2.

The fixing device 13 heats and presses the recording sheet on which the toner image has been formed by the image forming device 12, to thereby fix the toner image on the recording sheet. The recording sheet that has undergone the fixing process is delivered to the output tray 151, or to the insertion device 2 from the left side face of the apparatus main body.

The transport device 15 includes the transport roller pair, a delivery roller pair, and transport motors respectively connected to the transport roller pair and the delivery roller pair. The control device 10 drives the transport motors so as to rotate the transport roller pair and the delivery roller pair, thereby causing those roller pairs to transport the sheet delivered from the paper feeding device 14, along the transport route.

The network I/F 91 is a communication interface that transmits and receives various types of data to and from an external device (e.g., a PC) inside a local area, or on the internet.

The storage device 8 is a large-capacity storage device such as a hard disk drive (HDD) or a solid-state drive (SSD). The storage device 8 contains various control programs.

The control device 10 includes a processor, a random-access memory (RAM), a read-only memory (ROM), and an exclusive hardware circuit. The processor is, for example, a central processing unit (CPU), an application specific integrated circuit (ASIC), or a micro processing unit (MPU).

The control device 10 acts as a controller 100 and an executer 101, when the processor operates according to a control program stored in the storage device 8. Here, the controller 100 and the executer 101 may be constituted in the form of a hardware circuit, instead of being realized by the operation of the control device 10 according to the control program. This also applies to other embodiments, unless otherwise specifically noted.

The controller 100 serves to control the overall operation of the image forming apparatus 1. The controller 100 is connected to the document feeding device 6, the document reading device 5, the image forming device 12, the fixing device 13, the paper feeding device 14, the transport device 15, the operation device 47, the network I/F 91, the storage device 8, the insertion device 2, and the postprocessing device 3, and controls the operation of the mentioned components. For example, the controller 100 controls the image forming device 12 to execute the printing job, according to the printing job received from the external device such as the PC, thereby forming the image on the sheet and thus generating the printed material.

When the printing job includes an instruction to insert the interleaving paper, the controller 100 controls the insertion device 2 so as to insert the interleaving paper in the printed material, at an insertion start timing designated by the printing job. The insertion device 2 inserts the interleaving paper in the printed material, according to the instruction from the controller 100.

The executer 101 causes the image forming device 12 to execute the calibration at an execution start timing set in advance. The executer 101 has set the time point that a predetermined time TE has elapsed from the previous calibration to the execution start timing in advance.

The executer 101 starts to execute the calibration at the insertion start timing, when a time difference between the insertion start timing, for inserting the interleaving paper in the printed material, and the execution start timing of the calibration is within a predetermined permissible range.

Figure 3:
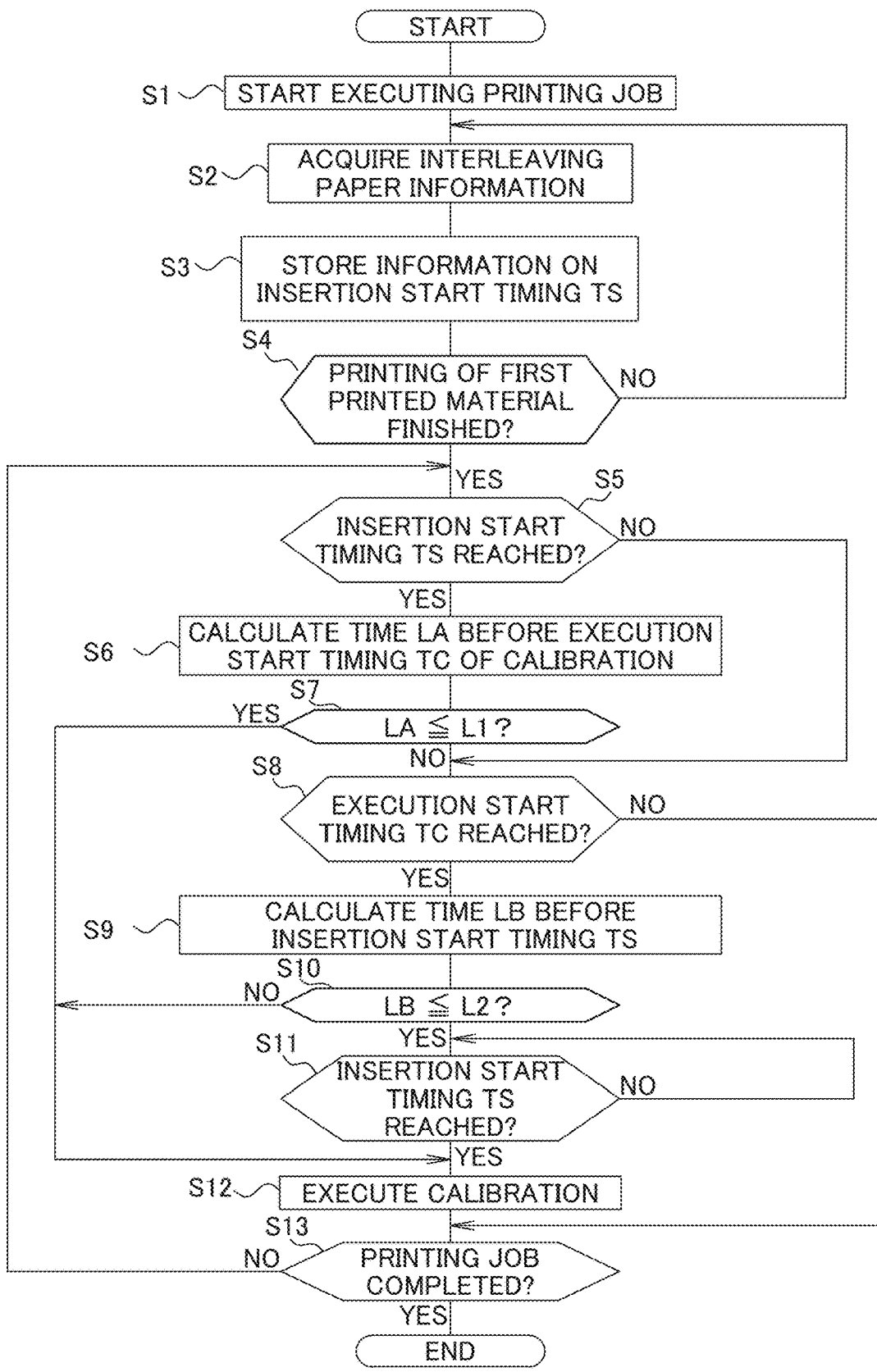
FIG. 3 is a flowchart showing an exemplary calibration process.

Referring now to a flowchart shown in FIG. 3, an exemplary calibration process performed by the image forming apparatus 1, including inserting the interleaving paper and delivering the sheet on which an image has been formed to the output tray 31, will be described hereunder. The calibration process is performed when the printing job includes printing a plurality of sheets.

The controller 100 controls the image forming device 12, to start the execution of the printing job, including the insertion of the interleaving paper (step S1). The controller 100 acquires information related to the interleaving paper (e.g., information about the insertion start timing TS) from information indicated by the printing job, while the image forming device 12 is printing the first printed material (step S2). The controller 100 stores the acquired information about the insertion start timing TS, for example in the RAM (step S3).

The controller 100 decides whether the printing of the first printed material has been finished, in the printing job currently being executed (step S4). When the controller 100 decides that the printing of the first printed material has been finished, (YES at step S4), the controller 100 causes the image forming device 12 to start to print the second and subsequent printed materials, and the executer 101 decides whether the insertion start timing TS of the interleaving paper has been reached, on the basis of the information stored at step S3 (step S5). When the controller 100 decides that the printing of the first printed material has not been finished, (NO at step S4), the controller 100 returns to step S2.

Upon deciding that the insertion start timing TS of the interleaving paper has been reached (i.e., now is the insertion start timing TS) (YES at step S5), the executer 101 calculates a time LA, from the current time point (insertion start timing TS of the interleaving paper) to an immediately subsequent execution start timing TC of the calibration. The executer 101 calculates the execution start timing TC of the calibration by adding the elapsed time TE to the time point that the previous calibration was executed. FIG. 4A is a time chart for explaining the time LA from the insertion start timing TS of the interleaving paper to the execution start timing TC of the calibration.

The executer 101 decides whether the time LA calculated as above is equal to or shorter than a first time L1, corresponding to the predetermined permissible range that allows the execution start timing TC of the calibration to be changed (step S7). Upon deciding that the time LA is equal to or shorter than the first time L1 (YES at step S7), the executer 101 decides that the time difference between the insertion start timing TS and the execution start timing TC is within the predetermined permissible range, and causes the image forming device 12 to execute the calibration (step S12). In other words, the executer 101 moves up the calibration, and executes the calibration in parallel with the insertion of the interleaving paper.

Figure 4C:
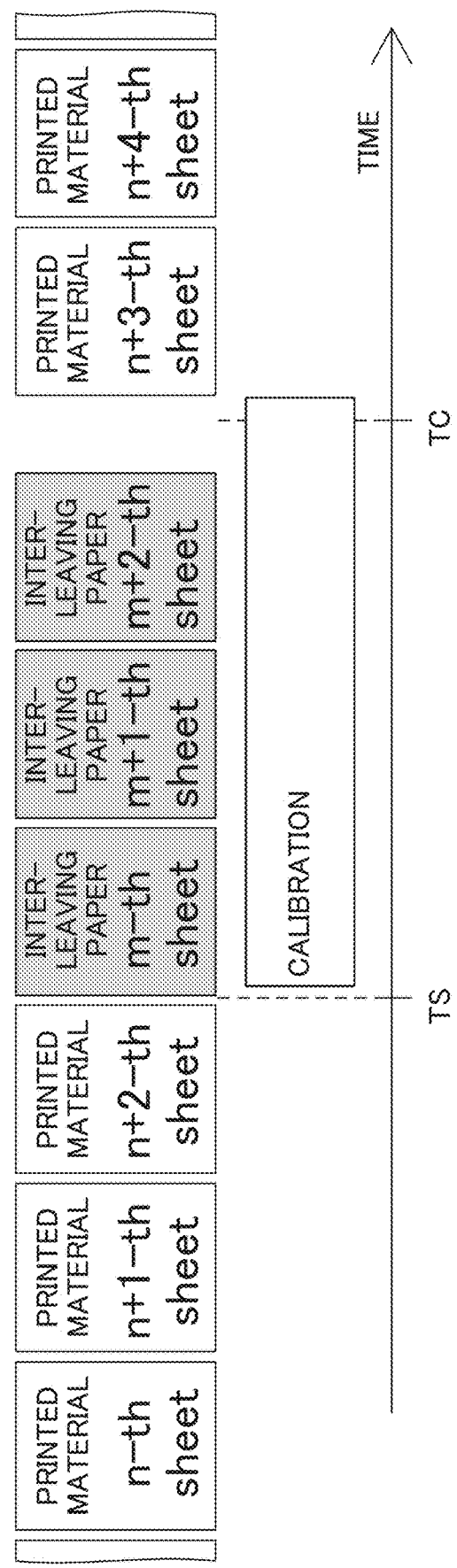
FIG. 4C is a time chart for explaining another case where the calibration has been moved up.

FIG. 4B and FIG. 4C are time charts for explaining the case where the calibration has been moved up and executed in parallel with the insertion of the interleaving paper. When the calibration is completed within the time during which three interleaving papers are inserted as shown in FIG. 4B, the printing job is kept from being interrupted, and therefore the time for executing the job is not prolonged. In the case where the calibration is not completed within the time during which three interleaving papers are inserted as shown in FIG. 4C, the printing job is interrupted. However, the interruption time is short, and the time for executing the job can be prevented from being significantly prolonged.

Upon deciding at step S5 that the insertion start timing TS of the interleaving paper has not been reached (NO at step S5), and at step S7 that the time LA is longer than the first time L1 (NO at step S7), the executer 101 decides whether the execution start timing TC of the calibration has been reached (step S8).

Upon deciding that the execution start timing TC of the calibration has been reached (YES at step S8), the executer 101 calculates a time LB, from the current time point (execution start timing TC of the calibration) to an immediately subsequent insertion start timing TS of the interleaving paper (hereinafter, next insertion start timing TS of the interleaving paper) (step S9). In contrast, upon deciding that the execution start timing TC of the calibration has not been reached (NO at step S8), the executer 101 proceeds to step S13. FIG. 5A is a time chart for explaining the time LB from the execution start timing TC of the calibration, to the next insertion start timing TS of the interleaving paper.

The executer 101 decides whether the time LB before the next insertion start timing TS of the interleaving paper is equal to or shorter than a predetermined second time L2, corresponding to a predetermined permissible range that allows the execution start timing TC of the calibration to be changed (step S10). Upon deciding that the time LB is equal to or shorter than the second time L2 (YES at step S10), the executer 101 decides that the time difference between the next insertion start timing TS of the interleaving paper and the execution start timing TC of the calibration is within the predetermined permissible range, and then decides whether the next insertion start timing TS of the interleaving paper has been reached (step S11).

Here, the first time L1 and the second time L2 may be equal to each other. The first time L1 refers to the time in which the immediately next execution start timing TC of the calibration, subsequent to the insertion start timing TS of the interleaving paper, may be changed (i.e., the time in which the execution start timing TC of the calibration may be moved up). The second time refers to the time in which the execution start timing TC of the calibration may be changed, in the case where the immediately next insertion start timing TS of the interleaving paper is reached after the execution start timing TC of the calibration (i.e., the time in which the execution start timing TC of the calibration may be pushed back). Therefore, the first time L1 and the second time L2 may be different from each other.

Upon deciding that the next insertion start timing TS of the interleaving paper has been reached (YES at step S11), the executer 101 causes the image forming device 12 to execute the calibration (step S12). In other words, the executer 101 pushes back the calibration, and executes the calibration in parallel with the insertion of the interleaving paper.

Figure 5B:
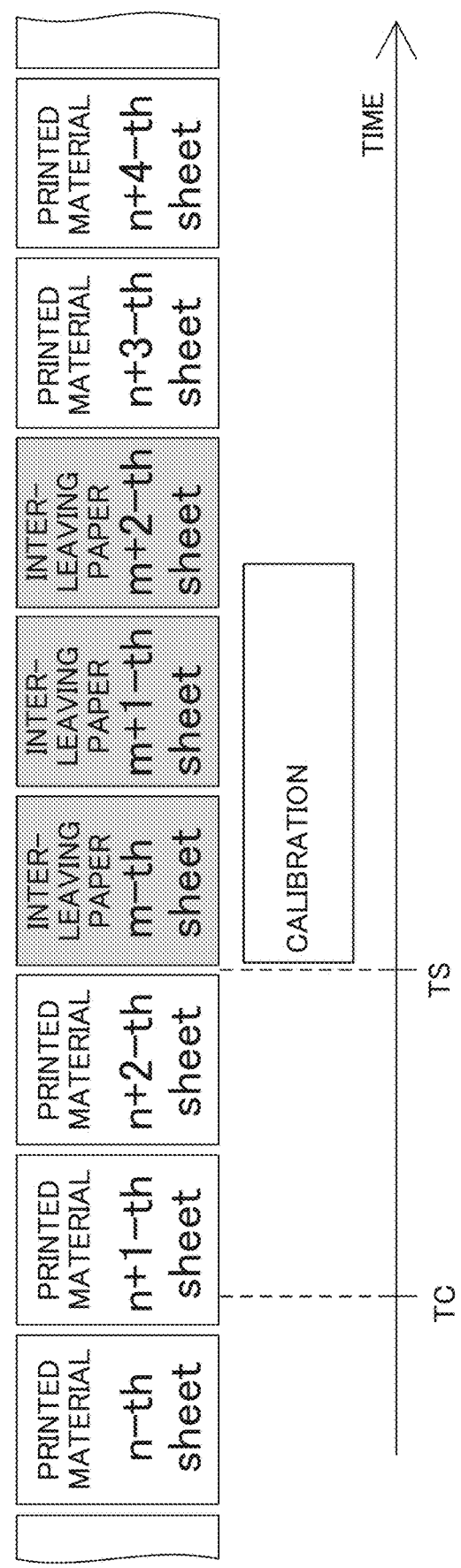
FIG. 5B is a time chart for explaining the case where the calibration has been pushed back.
Figure 5C:
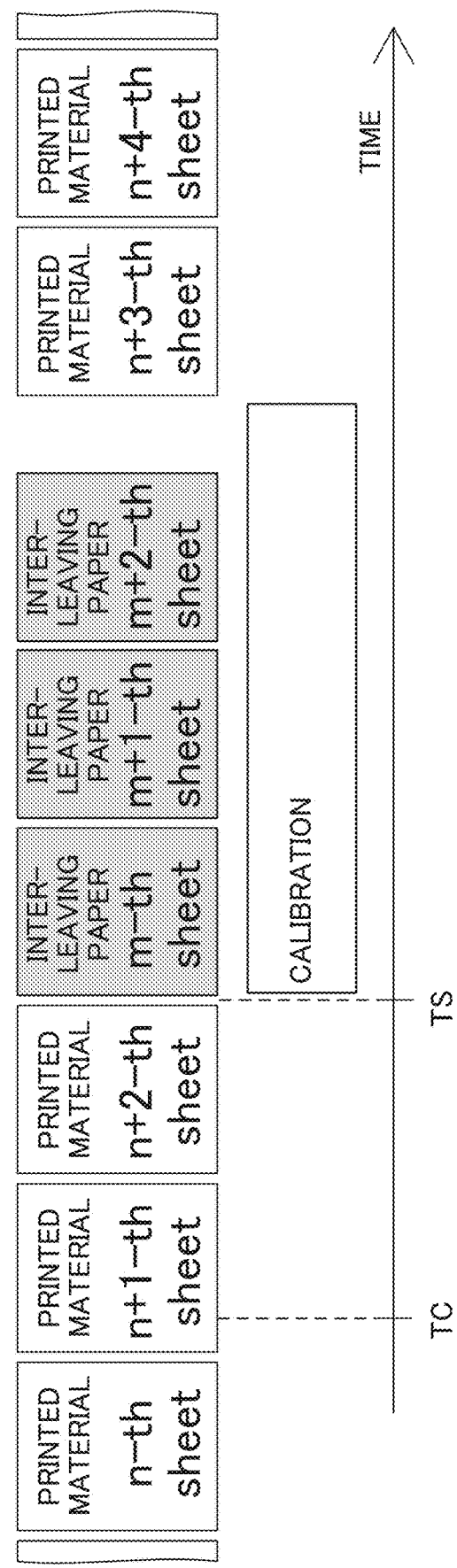
FIG. 5C is a time chart for explaining another case where the calibration has been pushed back.

FIG. 5B and FIG. 5C are time charts for explaining the case where the calibration has been pushed back and executed in parallel with the insertion of the interleaving paper. When the calibration is completed within the time during which three interleaving papers are inserted as shown in FIG. 5B, the printing job is kept from being interrupted, and therefore the time for executing the job is not prolonged. In the case where the calibration is not completed within the time during which three interleaving papers are inserted as shown in FIG. 5C, the printing job is interrupted. However, the interruption time is short, and the time for executing the job can be prevented from being significantly prolonged.

In contrast, upon deciding at step S10 that the time LB is longer than the second time L2 (NO at step S10), the executer 101 causes the image forming device 12 to execute the calibration, without standing by for the insertion start timing TS of the interleaving paper, because the time difference between the insertion start timing TS and the execution start timing TC is unable to be regarded as within the predetermined permissible range (step S12). Thus, the calibration is kept from being pushed back, and executed while the printing job is interrupted. Such an arrangement prevents degradation in picture quality of the printed material.

After the executer 101 executes the calibration at step S12, the controller 100 decides whether the printing job has been completed (step S13). Upon deciding that the printing job has been completed (YES at step S13), the controller 100 finishes the calibration process. In the case where the printing job has not been completed yet (NO at step S13), the controller 100 returns to step S5.

Now, the aforementioned existing image forming apparatus suspends the printing job currently being executed, when the execution start timing of the calibration is reached during the execution of the printing job, and executes the calibration. Therefore, the time from the start of the printing job to the end thereof (job execution time) is prolonged, which leads to degraded productivity. In addition, the prolonged job execution time results in an increase in power consumption.

Figure 6A:
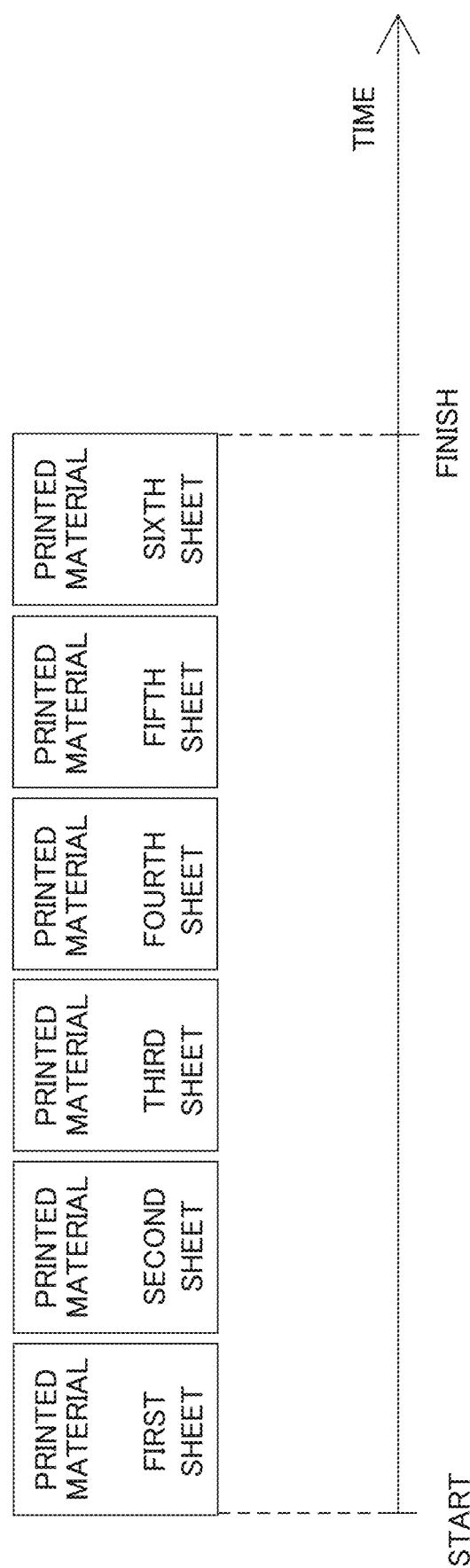
FIG. 6A is a time chart showing an exemplary operation performed by an existing image forming apparatus, when normally executing a printing job.

FIG. 6A and FIG. 6B are time charts showing an exemplary operation performed by the existing image forming apparatus, from the start of the printing job to the end thereof. FIG. 6A represents the case where the printing job has been normally executed. FIG. 6B represents the case where the execution start timing of the calibration is reached, during the formation of the printed material. As shown in FIG. 6B, when the execution start timing of the calibration is reached during the printing of the fifth sheet of the printed material, the existing image forming apparatus suspends the printing job after completing the printing of the fifth sheet of the printed material and executes the calibration, and then prints the sixth sheet of the printed material, after finishing the calibration. As is apparent from FIG. 6A and FIG. 6B, suspending the printing job for executing the calibration results in prolonged job execution time.

Executing the calibration after completing the printing job, without suspending the printing job (i.e., pushing back the calibration), prevents the job execution time from being prolonged. However, the picture quality of the printed material may fail to be secured and be degraded. Although the existing image forming apparatus can prevent the degradation in picture quality of the printed material, the function to improve the productivity, and the function to reduce the power consumption are not provided.

According to the foregoing embodiment, in contrast, the calibration is started at the insertion start timing TS of the interleaving paper. In other words, the calibration is executed in parallel with the insertion of the interleaving paper. Since the image forming device 12 does not execute the printing during the insertion of the interleaving paper, executing the calibration in parallel with the insertion of the interleaving paper does not affect the execution of the printing job.

Accordingly, the job execution time is kept from being prolonged owing to the execution of the calibration, and therefore the productivity can be improved and the power consumption can be reduced. Further, since the calibration is not pushed back, the degradation in picture quality of the printed material is not incurred. Consequently, the degradation in picture quality of the printed material can be prevented, and at the same time the productivity can be improved and the power consumption can be reduced.

The disclosure may be modified in various manners, without limitation to the configuration according to the foregoing embodiment. For example, the executer 101 according to the embodiment proceeds to step S6 upon deciding that the insertion start timing TS of the interleaving paper has been reached (i.e., now is the insertion start timing TS) (YES at step S5), and executes the calibration at the timing determined through the operation of step S6 to step S11. However, the disclosure is not limited to such embodiment. For example, the executer 101 may immediately execute the calibration (step S12), without going through step S6 to step S11, upon deciding that the insertion start timing TS of the interleaving paper has been reached (YES at step S5).

The configurations and processings according to the foregoing embodiments, described with reference to FIG. 1 to FIG. 5C, are merely exemplary and in no way intended to limit the disclosure to those configurations and processings. For example, although the image forming apparatus according to the disclosure is exemplified by the multifunction peripheral in the embodiment, the image forming apparatus may be a different electronic apparatus having the printing function, without limitation to the multifunction peripheral.

While the present disclosure has been described in detail with reference to the embodiments thereof, it would be apparent to those skilled in the art the various changes and modifications may be made therein within the scope defined by the appended claims.

What is claimed is:
1. An image forming system comprising:
an image forming apparatus including an image forming device that forms an image on a sheet, thereby producing a printed material, and a transport device that transports the sheet; and
an insertion device that inserts an interleaving paper in the printed material, by providing the interleaving paper on a downstream side of the image forming device in a sheet transport direction,
the image forming apparatus further including a control device including a processor, and configured to act, when the processor executes a control program, as:
a controller that causes the image forming device to execute a printing job, and causes the insertion device to insert the interleaving paper in the printed material at an insertion start timing designated by the printing job; and
an executer that executes calibration, for maintenance and adjustment of picture quality of the printed material, at an execution start timing set in advance, and sets a time point that a predetermined time has elapsed after a previous calibration to the execution start timing in advance, and
the executer starts to execute the calibration at the insertion start timing, when a predetermined condition is satisfied, wherein the executer starts to execute the calibration at the insertion start timing, when a time difference between the insertion start timing and the execution start timing is within a predetermined permissible range that allows the execution start timing to be changed.

2. The image forming system according to claim 1,
wherein the executer decides that the time difference is within the permissible range, when, at the insertion start timing, a time from the insertion start timing to an immediately next execution start timing, subsequent to the insertion start timing, is equal to or shorter than a predetermined first time corresponding to the permissible range.

3. The image forming system according to claim 1,
wherein the executer decides that the time difference is within the permissible range, when, at the execution start timing, a time from the execution start timing to an immediately next insertion start timing, subsequent to the execution start timing, is equal to or shorter than a predetermined second time corresponding to the permissible range.

4. The image forming system according to claim 1,
wherein the executer starts to execute the calibration at the insertion start timing, when the image forming device is scheduled to print a plurality of the printed materials, and after the image forming device has finished printing a first printed material, and
the executer acquires information about the insertion start timing from information indicated by the printing job, while the image forming device is printing the first printed material, and decides whether the time difference is within the permissible range, on a basis of the information acquired.

5. The image forming system according to claim 1,
wherein the executer starts to execute the calibration at the execution start timing, when the time difference is deviated from the permissible range.

* * * * *